United States Patent Office 3,053,830
Patented Sept. 11, 1962

3,053,830
PROCESS FOR PREPARING CARBOHYDRATE MONO-ESTERS
Van R. Gaertner, Dayton, Ohio, assignor to Monsanto Chemical Company, St. Louis, Mo., a corporation of Delaware
No Drawing. Filed Nov. 2, 1959, Ser. No. 850,037
11 Claims. (Cl. 260—234)

This invention is directed to a process for preparing carbohydrate mono-esters of β- or γ-carboxy aliphatic hydrocarbyl radical containing carboxylic acids. More particularly, this invention is directed to a process involving the reaction between a higher hydrocarbon or oxahydrocarbon radical containing cyclic acid anhydride and a carbohydrate.

In applicant's copending application, S.N. 594,697, filed June 29, 1956, now U.S. Patent No. 2,973,353, issued February 28, 1961, there is disclosed and claimed new water soluble, surface active ester compounds prepared by reacting an aliphatic dicarboxylic acid anhydride compound with a carbohydrate which is a saccharide having no more than two saccharide units in the presence of a basic catalyst. Those ester compounds were found to be good surfactants with a wide variety of uses, e.g., as detergents, wetting agents, lathering agents, emulsifying agents. They are important because they can be readily prepared from plentiful, relatively inexpensive materials, e.g. sucrose, glucose, fructose, etc.

It is an object of this invention to provide an improved process by which water soluble carbohydrate mono-esters of dicarboxylic acid compounds are prepared in good yields, in some cases, essentially quantitative yields, with good color and good surface activity in a minimum of time and under reaction conditions which will not substantially affect the organic reactants.

Other objects of this invention will be apparent from the description given below.

The ester compounds being prepared by the process of this invention are those represented by the formula

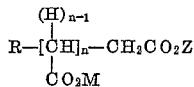

in which Z is a monovalent carbohydrate radical containing no more than two saccharide units, R is a monovalent organic radical containing 6 to 20 carbon atoms, M is hydrogen or a salt-forming cation, and $n$ is a small whole number from 1 to 2.

The terms "higher" or "higher molecular weight" are used herein referring to esters in which the acid residue has at least 10 carbon atoms.

Some of the preferred esters prepared by the process of this invention are the β-carboxy aliphatic carboxylic esters of sugars and sugar alcohols. Such compounds can be represented by the structure

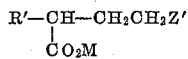

in which Z' represents a sugar or sugar alcohol, R' represents a monovalent aliphatic radical of from 6 to 20 carbon atoms, and M represents hydrogen or a salt-forming cation. The term "carboxy" as used in the present specification, is defined to mean the radical "—CO₂M" covering both the free carboxy groups and carboxy salt groups. It is still more preferred that R' in the above structure have 10 or more carbon atoms.

The term "carbohydrate" as used herein, is intended to include the sugar alcohols, i.e., the polyols such as sorbitol, as well as the sugars, glycosides, etc. The carbohydrate portion of my new esters can be a residue of any one or mixtures of the foregoing, e.g., a ketose, aldose, α- or β-glycoside, disaccharide, etc., such as glucose, fructose, methyl α-D-glucoside, sorbitol, sucrose, and similar materials. It is preferred that the carbohydrate portion be formed from a reducing or non-reducing disaccharide, e.g., lactose, maltose, or sucrose. Also very suitable are the ester compounds formed from other sugars having up to two saccharide units, from ketopentoses or ketohexoses, or from glycoside derivatives of sugars, particularly from glycosides of pentoses or hexoses. Among the useful ketopentoses and ketohexoses are D-fructose, L-sorbose, L-xylulose, etc. Examples of useful glycosides are α-methyl-D-glucoside, β-methyl-D-glucoside, β-methyl-fructoside, γ-methylglucoside, γ-methyl-L-fructoside and other aldosides from the methyl-, ethyl-, propyl-, isopropyl-, butyl-, isobutyl-, cyclohexyl-, and phenylarabinosides, glucosides, galactosides, etc.

In addition to the above, the carboxy aliphatic acid carbohydrate esters of polyols such as sorbitols, D-mannitol, D-arabitol, xylitol, etc. are useful surfactants.

While, in general, any carbohydrate can be used for the esterification reaction described herein, those resulting compounds in which the carbohydrate portion is a saccharide containing no more than two saccharide units, such as sugar or sugar alcohol, have greater solubility in water and otherwise have more useful surfactant properties. Such sugars or sugar alcohols are polyhydric alcohols, usually containing at least four hydroxyl groups, having each of their carbon atoms attached to at least one oxygen atom, and preferably having at least five carbon atoms. The carbohydrate portion of my preferred compounds ordinarily does not have a molecular weight greater than about 500; the total molecular weight of these compounds is ordinarily less than 1000.

The compounds prepared by the process of this invention are essentially monomeric mono-esters, i.e., each carbohydrate portion is chemically bonded to only one carboxy carboxylic acid residue. Because of the greater reactivity of the primary hydroxyls in the carbohydrates, there is little tendency to esterify more than one hydroxyl of the carbohydrates. When the carbohydrate is sucrose, it is believed that for the most part the acid anhydride esterifies only the primary hydroxyl on the glucose moiety because of the recognized greater reactivity of this hydroxyl group. Similarly there is no tendency toward the formation of a diester from the dicarboxylic acid anhydride, for when one ester group is formed, the simultaneously formed free carboxyl group is extremely resistant to esterification. The ester group is formed on the carboxyl group non-gem to the hydrocarbon or oxahydrocarbon substituent, as such "primary" carboxyls are more readily esterified.

The list of compounds prepared by the process of this invention includes the mono-carbohydrate esters of substituted succinic and glutaric acids, and their salts. The acids for the esterification must have a side chain of 6 to 20 or more carbon atoms for the ester to have desirable surfactant properties. Particularly suitable acids can be prepared by condensing compounds of about 6 to 20 carbon atoms such as mono-olefins, alkyl chlorides, or aliphatic alcohols with α, β-unsaturated acid anhydrides or the esters thereof in the monomer described in Patents No. 2,283,214 and No. 2,380,699 to Lucas P. Kyrides. It is particularly preferred to use the condensation products of olefins such as diisobutylene, triisobutylene, tetraisobutylene, tetrapropylene, etc. with maleic acid or maleic anhydride; maleic acid may be replaced by its isomeric form, fumaric acid. The substituted succinic and glutaric acids must be in the form of their anhydrides for the esterification process of the present invention, as little or no esterification takes place when the free dicarboxylic acids are reacted. The aforenamed polyalkylenes can, for example, be prepared by polymerization of isobutylene or propylene with sulfuric acid or metal halides, or result from simultaneous dehydration and polymerization of tertiary butyl alcohol or isopropyl alcohol by concentrated sulfuric acid.

The products of olefin and maleic anhydride condensation can be represented by the formula:

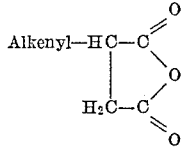

in which alkenyl represents the olefinic residue, e.g., the triisobutylene residue; the olefinic unsaturation is retained in the residue. The mono-carbohydrate esters of such anhydrides and their salts, can be represented by the formula:

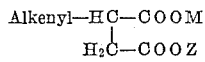

in which Z and M have the same meaning as hereinbefore.

Among the various acids which, in the form of their anhydride, can be mono-esterified with a carbohydrate to give a useful surfactant are dodecenylsuccinic acid, tetrapropenylsuccinic acid, 3-dodecenyl-pentan-1,5-dioic acid, 2-isooctenylpentan-1,5-dioic acid, 3-hexenylpentan-1,5-dioic acid, tetraisobutenylsuccinic acid, (3-phenylpropenyl)-1,5-dioic acid, (5-cyclohexylpentenyl)-succinic acid, eicosinylsuccinic acid, etc. The cyclic anhydrides containing 4 to 6 carbon atoms in their rings are preferred, both because of higher stability and greater availability.

A few examples of the surfactant mono-esters prepared by the process of this invention are: monosorbitol diisobutenylsuccinate, mono-$\beta$-methylfructoside tetrapropenylsuccinate, monomaltose tridecenylsuccinate, mono-sorbose tetraisobutenylsuccinate, mono-D-mannitol eicosenylsuccinate, glucose 3-hexadecenylpentan-1,5-dioic acid mono-ester, etc. The above monocarbohydrate esters have a free —C(O)OH group and are useful as such. However, they are generally utilized in the form of a water soluble salt, such as can be formed with a cation, particularly water solubilizing salt-forming cations. Suitable cations are usually alkali metal, alkaline earth metal, organic amine, or an ammonium ion. Representative cations which are effective are $Na^+$, $Ca^+OH$, $NH_4^+$, $K^+$, etc.; fact, any of the salts obtained by neutralizing the free acid group with the following bases are useful: ammonia, ethanolamine, diethanolamine, triethanolamine, ethylamine, t-butylamine, t-octylamine, morpholine, lime, calcium carbonate, magnesium carbonate, potassium hydroxide, etc.

One of the requirements of the process of this invention is that the reaction between the carbohydrate and the hydrocarbon or oxahydrocarbon-substituted cyclic acid anhydride take place in the presence of an appropriate solvent and basic catalyst. The solvent must be one that is non-reactive with the acid anhydride and yet be a good solvent for the carbohydrate starting material. The carbohydrate reactant, e.g., sucrose, which has 8 hydroxyls, must be soluble to a substantial extent, preferably completely soluble, in the solvent so that only one hydroxyl per sucrose molecule condenses with the acid anhydride reactant; otherwise more than one hydrophobe will be introduced per sucrose molecule. Examples of solvents which are suitable as a medium for conducting the esterification reaction are, for example, the dialkylacylamides such as dimethylformamide, diethylformamide, dipropylformamide, dimethylacetamide, diethylacetamide, dimethylpropionamide, etc., and the dialkylsulfoxides such as dimethylsulfoxide, diethylsulfoxide, etc. The lower alkyl acylamides and sulfoxides wherein the alkyl groups contain from 1 to 6 carbon atoms are preferred. The quantity of solvent used must be sufficient to dissolve the carbohydrate used in the reaction but otherwise is not essential. For example, with dimethylformamide as solvent, concentrations on the order of 150 to 400 grams of carbohydrate and dicarboxylic acid anhydride reactants per 1000 ml. of solvent are suitable, and similar ranges can be used in other solvents.

The basic catalyst which is used to promote the esterification reaction between the carbohydrate and acid anhydride reactants must be one which will not react with the acid anhydride reactant or otherwise deleteriously effect the esterification reaction. Tertiary amines are very suitable catalysts, e.g., pyridine, picoline, collidine, N-ethylpiperidine, triethylamine, tributylamine, diethylcyclohexylamine, and various other alkyl, cycloalkyl, cyclic, and heterocyclic tertiary amines. The amount of the catalyst can vary considerably, e.g., from 1 to 10 or 20% of the reaction mixture.

It is usually desirably in the process of the present invention to react the aliphatic hydrocarbon or oxahydrocarbon-substituted succinic or glutaric anhydride with the carbohydrate in approximately equimolar amounts. However, smaller amounts of the anhydride reactant can be used, e.g., 0.25 up to 1 mole of the cyclic acid anhydride for each mole of carbohydrate. The reaction is conducted by mixing the reactants together in presence of the solvent and the basic catalyst and allowing the reaction to proceed. Although reaction will take place at room temperature to a small extent, optimum results are obtained when the reaction mixture is stirred and gently heated to from 50 to 120° C. for from 15 minutes (0.25 hour) to 18 hours, the shorter reaction times ordinarily being used with the higher reaction temperatures. With the preferred reactants it is normally sufficient to heat the mixture to from 70 to 90° C. for from 30 minutes to 2 hours to obtain almost quantitative yields of the ester product.

When the reaction is completed the mono-carbohydrate esters having a free carboxyl group, are in solution of the solvent. Often it is preferred to remove the solvent and catalyst by known procedures, e.g. by vacuum distillation, and extract the product from any excess sugar in a solvent such as isopropanol or butanol. However, these compounds are generally utilized in the form of a water soluble salt, such as can be formed with a cation, particularly water solubilizing salt-forming cations. Suitable cations are usually alkali metals, alkaline earth metals, organic amines, or an ammonium ion. Representative cations which are effective are $Na^+$, $Ca^+OH$, $NH_4^+$, $K^+$, etc.; in fact, any of the salts obtained by neutralizing the free acid group with an aqueous solution of one of the following bases are useful: ammonia, ethanolamine, diethanolamine, triethanolamine, ethylamine, t-butylamine, t-octylamine, morpholine, lime, calcium carbonate magnesium carbonate, potassium hydroxide, etc.

These carbohydrate esters of hydrocarbon- or oxahydrocarbon-substituted succinic or glutaric acids prepared by the process of this invention are water soluble materials which oftentimes become resinous or gummy at room temperature.

Of the compounds prepared by the process of this invention the mono-sucrose alkenylsuccinates and their salts are the most preferred. Such compounds are very effective in lowering the surface tension of liquids. Moreover, sucrose is readily available and inexpensive.

Because of their property of lowering the surface activity of liquids, the new compounds of the present invention are eminently desirable for many applications. Among such uses are use as an emulsifying agent, dispersing agent, wetting agent, foaming agent, etc.

The following examples illustrate certain specific embodiments of my invention.

*Example 1*

Tetrapropenylsuccinic anhydride, 26.6 g. (0.10 mole) was mixed with a solution of 51.3 g. (0.15 mole) of ordinary table sugar (sucrose) in 150 ml. of dimethylformamide, and the resulting mixture was stirred and heated at 65° C. to 115° C. for about 25 minutes. A sample of the liquid showed some lathering activity in water but remained quite turbid. The heating of the reaction mixture was continued to a total of 45 minutes, the material showing the same activity as above. Then 7 ml. of pyridine was added. After only 10 minutes of stirring at 85° C., a diluted test sample of the product in water showed only faint turbidity and excellent lather activity. After 90 minutes of stirring the pyridine catalyzed mixture at 85° C. the stirring and heating were discontinued. The dimethylformamide solvent and the pyridine catalyst were removed by distilling under aspirator vacuum and the residue was dispersed in isopropyl alcohol. The solution was filtered to remove the unreacted excess sugar, and then the solution was aspirated to dryness to remove the isopropyl alcohol, leaving 61.7 g. of a hard, light colored resin product for a 101% yield based on the mono-sucrose tetrapropenylsuccinate product. The crude product probably contains some entrapped dimethylformamide. Further drying at 56° C. under vacuum for 24 hours gave a product analyzing as follows:

| Percent | Found | Calcd. for $C_{28}H_{48}O_{14}$ |
|---|---|---|
| C | 54.99 | 55.2 |
| H | 8.08 | 7.83 |

*Example 2*

To a solution of 34.2 g. of sucrose in 100 ml. of dimethylformamide (heated to aid dissolution) and 15.4 g. (0.050 mole) of pentadecenylsuccinic anhydride there was added 7.0 ml. of pyridine. The resulting mixture was heated at 90–95° C. for 45 minutes, though after only 15 minutes a sample diluted with water was clear. The solution was aspirated below 100° C. to remove the dimethylformamide solvent and pyridine. The hot residue was dispersed in isopropyl alcohol (500 ml. total), and filtered twice to remove the unreacted sucrose. The isopropyl alcohol was removed by distillation first under aspirator vacuum and finally to 100° C./0.1 mm., leaving 29.3 g. (90.0% yield) of an amber brittle resin, mono-sucrose pentadecenylsuccinic acid.

*Example 3*

Sucrose, 68.4 g. (0.20 mole) was mixed with 250 ml. of dimethylformamide, and heated to dissolve, and cooled. To this solution 26.6 g. (0.10 mole) of anhydrous triisobutenylsuccinic anhydride was added and the mixture was stirred and maintained at 70–77° C. for 25 minutes. A sample of the reaction mixture showed only a little lathering activity in water. Then 1.0 ml. of pyridine was added to the reaction mixture while continuing the stirring and heating. Several samples taken thereafter at 15–30 minute intervals during the next 90 minutes showed increasing activity of the product in water as a lathering agent. After cooling the mixture overnight, samples of the product produced clear and high stable foams in both distilled and tap water. The dimethylformamide solvent was distilled off under the aspirator vacuum to a pot temperature of 80° C. The very viscous slurry residue was treated with isopropyl alcohol, stirred, and filtered. The sucrose filter cake was washed thoroughly with isopropyl alcohol. The isopropyl alcohol filtrates gave a clear high foam when tested in water. The alcohol solution was evaporated to dryness, finally at 1 mm. vacuum pressure, leaving a near-white brittle blown gum, 62 g., 102% yield of mono-sucrose triisobutenylsuccinate. Some dimethylformamide may be present. A sample was redried at 56° C./1 mm. for 24 hours and analyzed as follows:

| Percent | Found | Calcd. for $C_{28}H_{48}O_{14}$ |
|---|---|---|
| C | 55.84 | 55.2 |
| H | 8.62 | 7.93 |

*Example 4*

Sucrose, 68.4 g., was dissolved in 250 ml. of dimethylformamide with the aid of slight heating, and then the solution was cooled to 60° C. Then 26.6 g. of a mixture of purified $C_{10}$–$C_{12}$ alkenyl succinic anhydride (Solvay ASA), and 2.0 g. of pyridine were added. The mixture was then stirred and heated at from 75° to 85° C. three and one-half hours to insure complete reaction, though a sample of the product gave a clear, high foaming solution in water after only 90 minutes. The dimethylformamide was aspirated off at 80° C., and the residue was treated with isopropyl alcohol in a Waring Blendor. The mixture was filtered to remove unreacted sugar, treated with charcoal to decolorize the solution, and filtered to remove the charcoal. The alcohol was taken off at up to 100° C./0.2 mm. On cooling, the residue, was a hard solid resin, mono-sucrose $C_{10}$–$C_{12}$ alkenylsuccinate, which was cracked away from the flask by cooling in Dry Ice. It weighed 60.2 g.; using $C_{11}$ as the average for the alkenyl group carbon number, the calculated yield is 101%. This product is a good detergent and an excellent lathering agent.

*Example 5*

Sucrose, 68.4 g. (0.20 mole) was added to 200 ml. of dimethylsulfoxide and dissolved therein with the aid of gentle stirring and heating to 80° C. Triisobutenylsuccinic anhydride, 26.6 g. (0.10 mole) was added, and the resulting mixture was stirred and heated for 2.25 hours during which time the temperature was slowly raised from 70° to a maximum of 86° C. Test samples of the reaction mixture in water showed increasing lathering activity but remained slightly turbid. Pyridine (2 ml.) was added, and the resulting mixture was stirred at 78–79° C. The mixture showed good lather activity in water, and the reaction was essentially complete. The solvent dimethylsulfoxide and the pyridine were aspirated of at <100° C. finally at <1 mm. Isopropyl alcohol (400 ml.) was added to the residue and the mixture was stirred and heated slightly to dissolve the product, cooled overnight, and filtered to remove the sugar. The alcohol was distilled finally to 100° C./0.1 mm. to obtain 68.7 g. of a yellow gum residue which was brittle when cooled. This gum contained about 7.9 g. of dimethylsulfoxide and/or sucrose since the theoretical yield of the product was 60.8 g., but it showed good lathering activity attributable only to the mono-sucrose triisobutenylsuccinic acid product.

This application is a continuation-in-part of applicant's copending application S.N. 594,697, filed June 29, 1956, now U.S. Patent 2,973,353, issued February 28, 1961.

I claim:

1. A method of making a water soluble mono-carbohydrate carboxy carboxylic acid ester surfactant which comprises mixing and reacting a carbohydrate having no more than 2 saccharide units with from 0.25 to 1 mole of a cyclic acid anhydride containing 10 to 25 carbon atoms for each mole of carbohydrate in the presence of a solvent selected from the group consisting of dialkyl-acylamides and dialkylsulfoxides having from 1 to 6 carbon atoms in each alkyl group and a basic tertiary amine catalyst, at a temperature of from 50° C. to 120° C.

2. The method according to claim 1 in which the mixure is heated to from 50 to 120° C. for from 0.25 to 18 hours.

3. The method according to claim 1 in which the mono-carbohydrate carboxylic acid ester product is separated from the solvent and catalyst mixture.

4. The method according to claim 3 in which the mono-carbohydrate carboxy carboxylic acid ester product is neutralized by treating it with an aqueous alkali solution.

5. The method according to claim 1 in which there are from 4 to 6 carbon atoms in the ring of the cyclic acid anhydride, and in which the carbohydrate is a disaccharide.

6. The method according to claim 5 in which the disaccharide is sucrose.

7. The method of making mono-sucrose triisobutenylsuccinate surfactant which comprises heating a mixture of sucrose and triisobutenylsuccinic anhydride to from 50 to 120° C. for from 0.25 to 18 hours in the presence of dimethylformamide and pyridine.

8. The method of making mono-sucrose tetrapropenylsuccinate surfactant which comprises heating a mixture of sucrose and tetrapropenylsuccinic anhydride to from 50–120° C. for from 0.25 to 18 hours in the presence of dimethylformamide and pyridine.

9. The method of making mono-sucrose triisobutenylsuccinate surfactant which comprises heating a mixture of sucrose and triisobutenylsuccinic anhydride to from 50° C. to 120° C. for from 0.25 to 18 hours in the presence of dimethylsulfoxide and pyridine.

10. The method of making a water soluble mono-sucrose monovalent aliphatic radical-containing succinate ester surfactant which comprises mixing and reacting sucrose with about an equimolar amount of a monovalent aliphatic radical-containing succinic anhydride in the presence of a solvent selected from the group consisting of dialkylacylamides and dialkylsulfoxides having from 1 to 6 carbon atoms in the alkyl groups, and a tertiary amine catalyst, said anhydride having a monovalent aliphatic radical side chain of from 6 to 20 carbon atoms at a temperature of from 50° C. to 120° C.

11. The method of making a water soluble mono-sucrose monovalent aliphatic radical-containing succinate ester surfactant which comprises mixing and reacting sucrose with about an equimolar amount of an monovalent aliphatic radical-containing succinic anhydride in the presence of a solvent selected from the group consisting of dialkylacylamides and dialkylsulfoxides having from 1 to 6 carbon atoms in the alkyl groups, and a tertiary amine catalyst, said anhydride having a monovalent aliphatic radical side chain of from 6 to 20 carbon atoms, at a temperature of from 50° C. to 120° C. for from 0.25 to 18 hours.

References Cited in the file of this patent

UNITED STATES PATENTS

| | | |
|---|---|---|
| 2,613,206 | Caldwell | Oct. 7, 1952 |
| 2,628,249 | Bruno | Feb. 10, 1953 |
| 2,661,349 | Caldwell et al. | Dec. 1, 1953 |
| 2,671,779 | Gaver et al. | Mar. 9, 1954 |
| 2,891,947 | Paschall et al. | June 23, 1959 |
| 2,973,353 | Gaertner | Feb. 28, 1961 |

UNITED STATES PATENT OFFICE
CERTIFICATE OF CORRECTION

Patent No. 3,053,830                                September 11, 1962

Van R. Gaertner

It is hereby certified that error appears in the above numbered patent requiring correction and that the said Letters Patent should read as corrected below.

Column 1, lines 58 to 60, the structural formula should appear as shown below instead of as in the patent:

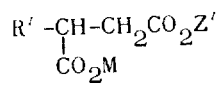

column 6, in the table, under the heading "Calcd. for $C_{28}H_{48}O_{14}$", line 1 thereof, for the percent carbon figure "55 2" read -- 55.2 --.

Signed and sealed this 2nd day of April 1963.

(SEAL)
Attest:

ESTON G. JOHNSON                                    DAVID L. LADD

Attesting Officer                                Commissioner of Patents